(12) United States Patent
Morton

(10) Patent No.: US 10,294,969 B2
(45) Date of Patent: May 21, 2019

(54) CLAMPING MECHANISM FOR HOLDING A VOLLEYBALL NET POSITIONAL SETTINGS IN PLACE

(71) Applicant: Keibu Morton, West Hartford, CT (US)

(72) Inventor: Keibu Morton, West Hartford, CT (US)

( * ) Notice: Subject to any disclaimer, the term of this patent is extended or adjusted under 35 U.S.C. 154(b) by 211 days.

(21) Appl. No.: 15/331,809

(22) Filed: Oct. 21, 2016

(65) Prior Publication Data
US 2017/0113110 A1 Apr. 27, 2017

Related U.S. Application Data

(60) Provisional application No. 62/244,698, filed on Oct. 21, 2015.

(51) Int. Cl.
| | | |
|---|---|---|
| F16B 2/00 | (2006.01) | |
| F16B 2/06 | (2006.01) | |
| F16B 2/18 | (2006.01) | |
| A63B 61/00 | (2006.01) | |
| A63B 69/00 | (2006.01) | |
| A63B 61/04 | (2006.01) | |

(52) U.S. Cl.
CPC ............ F16B 2/185 (2013.01); A63B 61/006 (2013.01); A63B 61/04 (2013.01); A63B 69/0095 (2013.01); F16B 2/005 (2013.01); F16B 2/06 (2013.01)

(58) Field of Classification Search
CPC ......... Y10T 403/7005; Y10T 403/7009; Y10T 403/7064; F16B 2/185; F16B 2/005; F16B 2/06; F16B 21/02; A63B 61/006; A63B 61/04; A63B 69/0095; B25B 3/00

USPC ........... 473/494, 493; 248/245; 269/3, 6, 95; 403/155, 350
See application file for complete search history.

(56) References Cited

U.S. PATENT DOCUMENTS

| | | | | |
|---|---|---|---|---|
| 2,794,664 | A * | 6/1957 | Kruger ...................... | E05C 3/34 220/324 |
| 4,014,572 | A * | 3/1977 | Binns .................. | E05B 65/0811 292/108 |
| 5,954,308 | A * | 9/1999 | Lane .................... | A63B 61/003 24/339 |
| 6,286,736 | B1 * | 9/2001 | Angus ...................... | A45C 1/04 224/236 |
| 7,097,575 | B1 * | 8/2006 | Chen .................... | A63B 71/023 473/494 |
| 2005/0193530 | A1 * | 9/2005 | Boda ...................... | A47B 57/54 24/513 |

(Continued)

*Primary Examiner* — John E Simms, Jr.
*Assistant Examiner* — Rayshun K Peng
(74) *Attorney, Agent, or Firm* — Dara L. Onofrio, Esq.; Onofrio Law

(57) ABSTRACT

A clamping device for holding an object in place comprising a female plate 10 with an exterior 11 and interior 12 surface and a bottom edge 15 with a plurality protrusions 16 wherein each of the protrusions has a opening 17 therein; a male plate 1 with an exterior 2 and interior 3 surface and a bottom edge 9 with a plurality of teeth 7; and at least two stepper keys 21 on said exterior 2 surface of the male plate 1; wherein the male teeth 7 fit snuggly within the female plate protrusion openings 17 such that the object placed between the male plate 1 and the female plate 10 is held in place by locking the stepper keys 21 in place.

17 Claims, 7 Drawing Sheets

(56) References Cited

U.S. PATENT DOCUMENTS

| 2013/0047934 A1* | 2/2013 | Morris | B60R 22/10 |
| | | | 119/771 |
| 2015/0226286 A1* | 8/2015 | Phillips | F16G 3/06 |
| | | | 24/38 |

* cited by examiner

CLAMPING MECHANISM FOR HOLDING A VOLLEYBALL NET POSITIONAL SETTINGS IN PLACE

This application claims the benefit of U.S. provisional application Ser. No. 62/244,698 filed Oct. 21, 2016 which is incorporated herein in its entirety by reference.

FIELD OF THE INVENTION

The present invention relates to a three part clamping mechanism for holding objects in place. More particularly, the invention relates to a clamping mechanism that is used to maintain the positional settings of a volleyball net to ensure quick setup of the net without the need for constant readjustment.

BACKGROUND OF THE INVENTION

In general setting up a volleyball net takes a long time because of the various adjustments that must be made. The net has to be pulled along an independent wire to align with the boundary lines and the antenna needs constant readjustment to keep it at the proper position on the volleyball net.

Setting up the volleyball net using the invention clamping device takes much less time than the usual method. Once the volleyball net has been set up in the usual way, the three part invention clamping device is secured on the net to maintain the selected position settings of the net. The net can then be broken down and when it comes time to set up again the invention clamping mechanism permits easy set up with the predetermined position settings without the need for constant readjustment.

It is intended that while the clamping mechanism is described as being used to maintain a volleyball net setting other applications are possible. These other applications include using the invention net clamping mechanism for badminton, tennis, and water polo nets and other like applications.

The invention mechanism can also be used in clamping volleyball antenna and/or boundary poles to the volleyball net.

The invention mechanism can also be used in clamping automated coaching and/or refereeing device to the volleyball net, pole, wire, boundary pole, and/or volleyball antenna.

An advantage of the present invention is in the provision of a clamping device to preserve the settings of a volleyball net.

Another advantage of the invention is in the elimination for the need to adjust the net.

Yet another advantage of the invention is in the elimination of routine application and removal or antenna or boundary pole.

Still another advantage of the invention is in its one size fits all application.

Yet another advantage of the invention is in the elimination of unnecessary yanking and stretching of the volleyball net.

Another advantage is in the vinyl padding that protects the net and provides traction during clamping.

Another advantage is in the stepper key which engages and disengages quickly.

SUMMARY OF THE INVENTION

In the present invention, these purposes, as well as others which will be apparent, are achieved generally by providing a clamping device for holding an object in place comprising a female plate 10 with an exterior 11 and interior 12 surface and a bottom edge 15 with a plurality protrusions 16 wherein each of the protrusions has a opening 17 therein; a male plate 1 with an exterior 2 and interior 3 surface and a bottom edge 9 with a plurality of teeth 7; and at least two stepper keys 21 on said exterior 2 surface of the male plate 1; wherein the male teeth 7 fit snuggly within the female plate protrusion openings 17 such that the object placed between the male plate 1 and the female plate 10 is held in place by locking the stepper keys 21 in place.

In preferred applications, the clamping device is used on a volleyball net to preserve positional settings and allows easy setup.

The invention also provides a method for maintaining the positional settings of a volleyball net after a game has ended to ensure quick setup without readjustment. The method specifically uses the clamping device of the invention.

Other objects, features and advantages of the present invention will be apparent when the detailed description of the preferred embodiments of the invention are considered with reference to the drawings, which should be construed in an illustrative and not limiting sense.

BRIEF DESCRIPTION OF THE DRAWINGS

FIG. 1 illustrates the male plate component of the invention.

FIG. 2 illustrates the female plate component of the invention.

FIG. 3 illustrates the stepper key component of the invention.

FIG. 6AB which illustrates the invention device closed on the net with the exterior of the female plate shown.

DETAILED DESCRIPTION OF THE INVENTION

As used in the specification and drawings herein the following reference numbers are associated with the structures described as follows:

1—Male plate
2—Male plate exterior surface
3—Male plate interior surface
4—Male plate—key opening
5—Male plate—circular protrusion
6—Male plate—circular depression
7—Male plate—teeth
8—Male plate top edge
9—Male plate bottom edge
10—Female plate
11—Female plate exterior surface 12—Female plate interior surface
13—Female plate top edge
14—Female plate—hollow tubular component
15—Female plate bottom edge
16—Female plate protrusions
17—Female plate openings in protrusions
18—Female plate upper surface of the hollow tubular component
19—Female plate lower surface of the hollow tubular component
20—Female plate—locking cavity
21—Stepper Key
22—Stepper Key opening
23—Stepper Key arm
24—Volleyball net antennae
25—Volleyball net
26—Fastener In accordance with the invention, and as illustrated in FIGS. 1 to 7, the various parts of the invention are shown.

The clamping device of the invention is used for holding an object in place and is made of essentially three parts a male plate, a female plate and a stepper key.

Figure 1A:
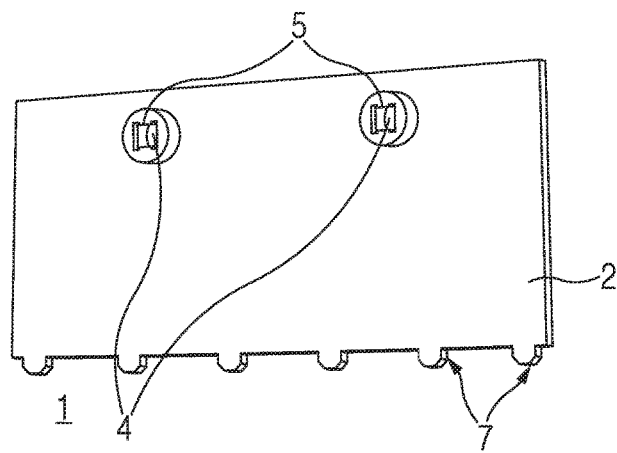
FIG. 1A is an exterior surface view of the male plate.
Figure 1B:
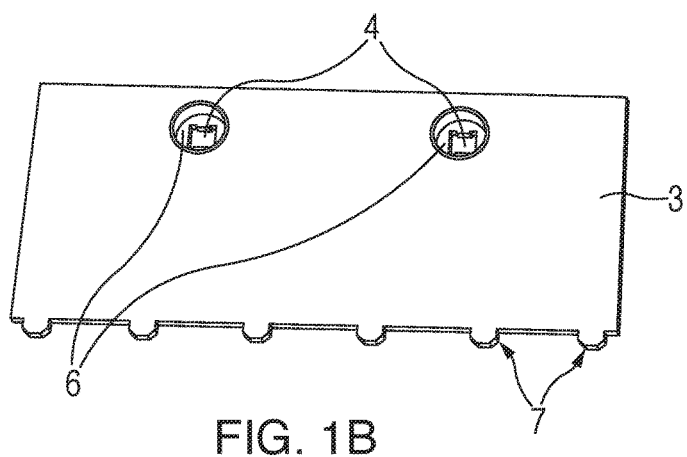
FIG. 1B is an inner surface view of the male plate.
Figure 1C:
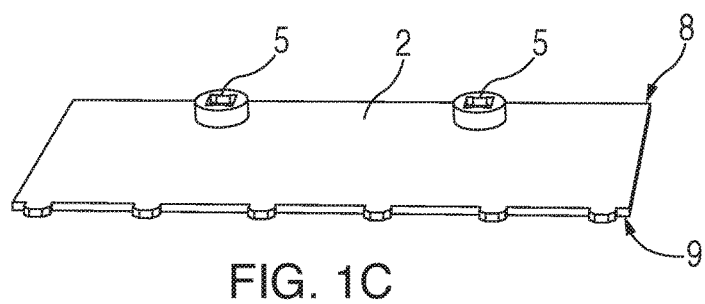
FIG. 1C is a frontal view of the male plate.

In particular FIG. 1 illustrates the male plate component of the invention. FIG. 1A is an exterior surface view of the male plate; FIG. 1B is an inner surface view of the male plate; and FIG. 1C is a frontal view of the male plate.

As shown in these figures the male plate 1 has an exterior surface 2 and interior surface 3 and a bottom edge 9 with a plurality of teeth 7. The male plate 1 preferably has six teeth 7, although it is within the invention to have more or less teeth.

The male plate 1 further includes a key opening 4 on the exterior surface 2 to attach the stepper key 21 in place.

The key opening 4 is a circular protrusion 5 on the exterior surface 2 of the male plate 1.

The key opening 4 is a circular depression 6 on the interior surface 3 of the male plate 1.

Figure 2A:
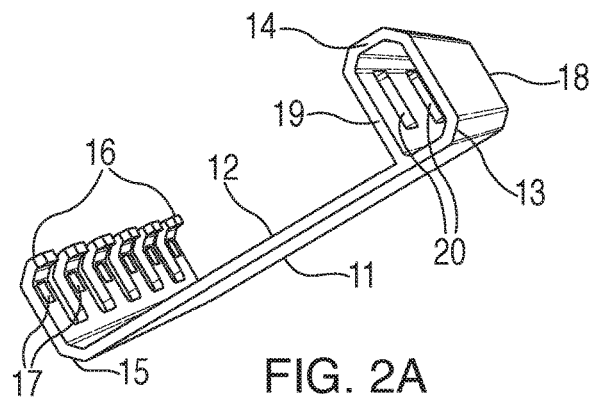
FIG. 2A is an side view of the female plate.
Figure 2B:
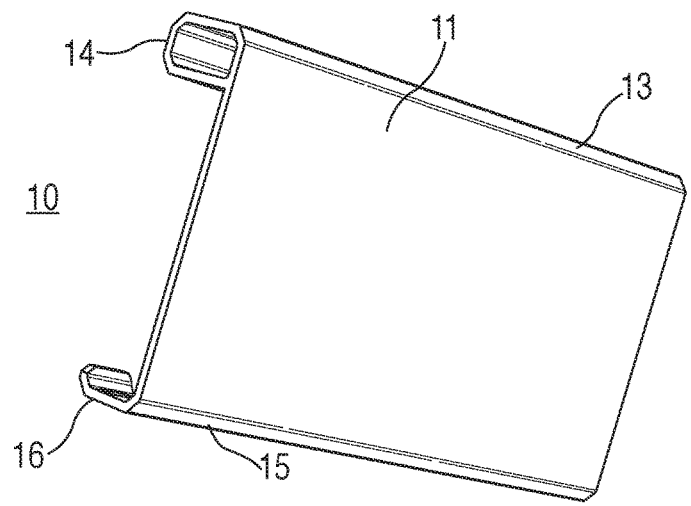
FIG. 2B is an exterior surface view of the female plate.
Figure 2C:
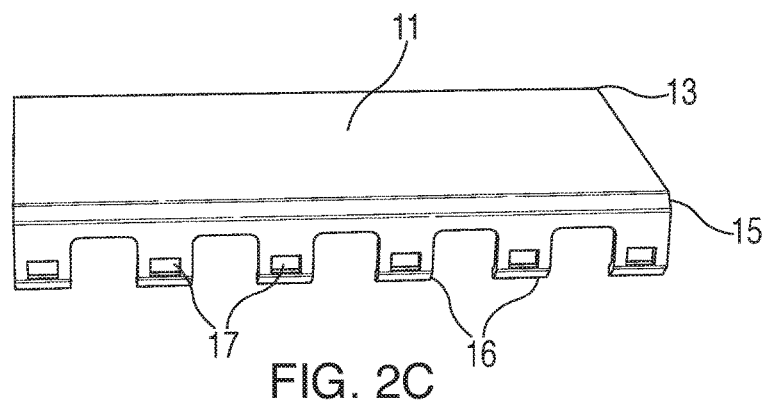
FIG. 2C is a frontal view of the female plate.

FIG. 2 illustrates the female plate component of the invention. FIG. 2A illustrates a side view of the female plate; FIG. 2B is an exterior surface view of the female plate; and FIG. 2C is a frontal view of the female plate.

As shown in these figures the female plate 10 has an exterior 11 and interior 12 surface and a bottom edge 15 with a plurality protrusions 16 wherein each of the protrusions has a opening 17 therein.

The female plate 10 exterior 11 and interior 12 surfaces are preferably both flat.

As shown in FIG. 2A female plate protrusions 16 are at a 90 degree angle to said bottom edge 15.

The female plate 10 further includes a top edge 13 with a hollow tubular component 14 extending at a 90 degree angle from the top edge 13.

The hollow tubular component 14 has a flat upper surface 18 and a flat lower surface 19.

There is a locking cavity 20 on the flat lower surface 19 of the hollow tubular component 14 for locking the stepper key 21 in place.

The hollow tubular component 14 extends from the top edge 13 approximately the same distance as the protrusions 16 on the bottom edge 15.

The female plate 10, preferably has six protrusions 16.

Figure 3A:
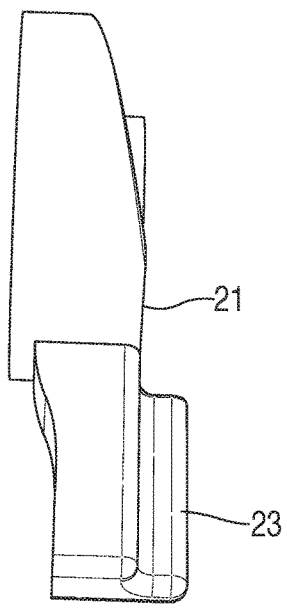
FIG. 3A is an top side view of the stepper key.
Figure 3B:
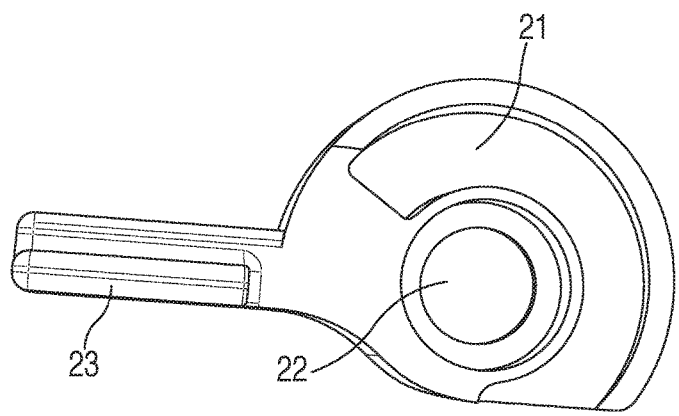
FIG. 3B is an frontal view of the stepper key.
Figure 3C:
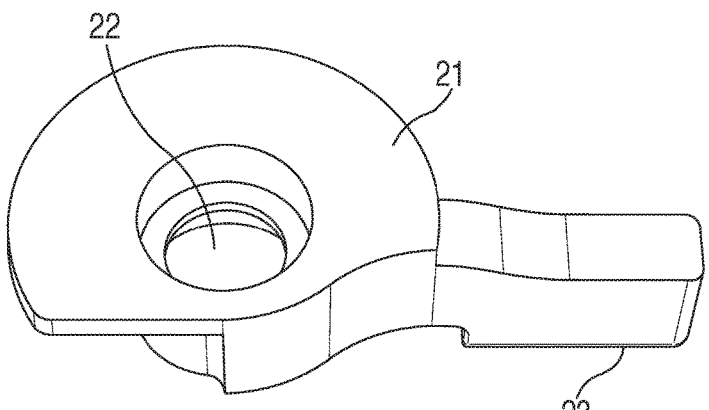
FIG. 3C is a backside bottom view of the stepper key.

FIG. 3 illustrates the stepper key component of the invention. FIG. 3A is a top side view of the stepper key; FIG. 3B is an frontal view of the stepper key; and FIG. 3C is a backside bottom view of the stepper key;

As shown in these figures at least two stepper keys 21 are present on the exterior 2 surface of the male plate 1. The stepper key 21 is fixed in place on the male plate 1 by a fastener 26.

At least one stepper key is necessary, but there can be an unlimited amount once they can fit on the male part surface.

The stepper key is used to bring the two flat faces of the male and female clamp together and to simultaneously securely clamp objects, which are placed between these two flat faces, of various sizes, with the same amount of clamping force.

The stepper key allows for fast engagement and disengagement of the clamping forces exerted between the two flat faces.

As shown in FIG. 2A the internal cavity of the hollow tubular component 14 is hollow so that there is enough space for the stepper key to spin as it is carries out the clamping motion. It is also a re-enforcing bar that strengthens the entire female structure so that it does not bend under the great clamping forces.

The male teeth 7 fit snuggly within the female plate protrusion openings 17 such that the object placed between the male plate 1 and the female plate 10 is held in place by locking said stepper keys 21 in place. The object is preferably a net for use in volleyball games.

Figure 4:
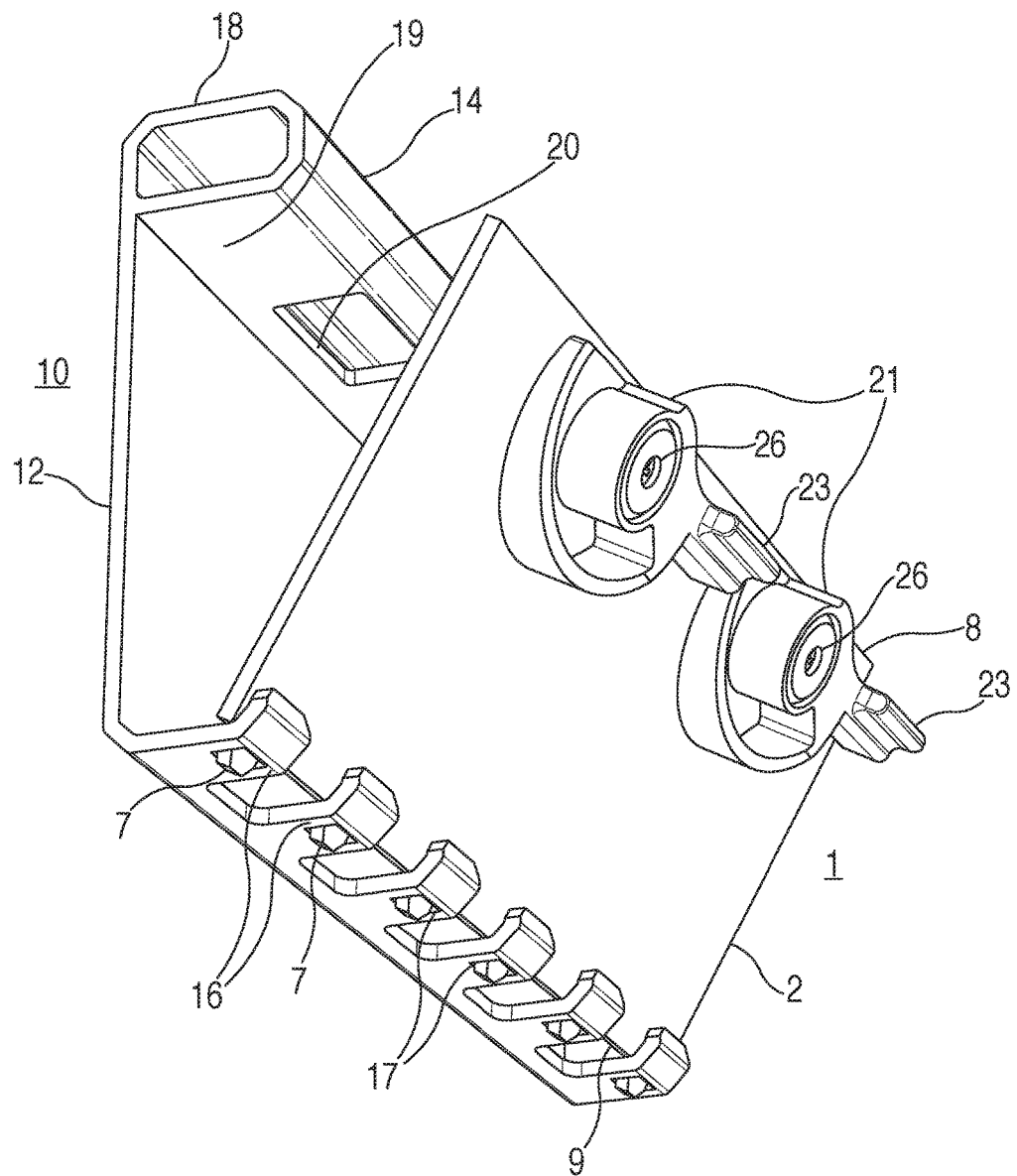
FIG. 4 is an illustration of the invention device in an open position showing the exterior surface of the male plate.

FIG. 4 is an illustration of the invention device in an open position showing the exterior surface of the male plate.

Figure 5:
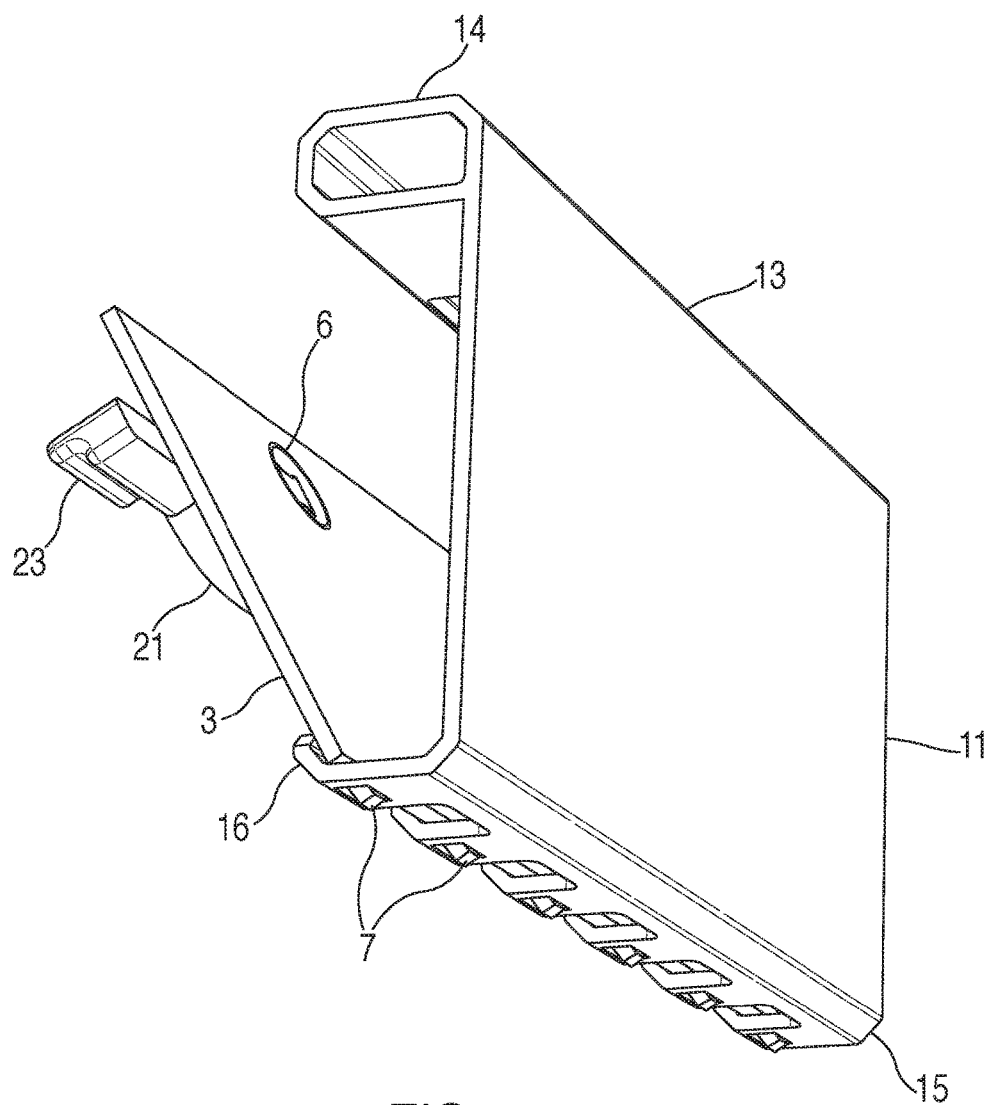
FIG. 5 is an illustration of the invention device in an open position showing the exterior surface of the female plate.

FIG. 5 is an illustration of the invention device in an open position showing the exterior surface of the female plate.

The clamping device may further include a foam material on the interior surfaces 3, 12 of said male 1 and female 10 plates.

When the device is closed said interior surfaces 3, 12 of said male 1 and female 10 plates are facing each other.

The female plate 10 and said male plate 1 are made of material selected from the group consisting of plastic, steel, carbon fiber, nylon and a combination thereof. A preferred material used in the invention is Complet LCF50-PA66 commercially available from PlastiComp Inc, Winona, Minn. This material lightweight and is made of nylon 66/long carbon fiber material.

In a preferred embodiment the invention provides a clamping device for holding a volleyball net in place including a female plate 10 with an exterior 11 and interior 12 surface and a bottom edge 15 with a plurality protrusions 16 extending at a 90 degree angle from the bottom edge 15 wherein each of the protrusions 16 having a opening 17 therein and a top edge 13 with a hollow tubular component 14 with a locking cavity 20, wherein the hollow tubular component 14 extends at a 90 degree angle from the top edge 13.

The male plate 1 has an exterior 2 and interior 3 surface and a bottom edge 9 with a plurality of teeth 7, wherein the exterior surface 2 has a key opening 4.

The stepper key 21 is on the exterior 2 surface of the male plate 1 affixed in the key opening 4.

The male plate teeth 7 fit snuggly within said female plate protrusion openings 17 such that the net 25 placed between the male plate 1 and the female plate 10 is held in place by locking the stepper keys 21 in place in the locking cavity 20 of the hollow tubular component 14.

The dimensions of the clamping device is preferably between 8 to 10 inches wide, 4 to 6 inches tall and 1 to 2 inches deep.

Also included in the invention is a method for maintaining the positional settings of a volleyball net after a game has ended to ensure quick setup without readjustment.

FIG. 6A illustrates the invention device closed on the net with the exterior of the male plate shown. FIG. 6AB illustrates the invention device closed on the net with the exterior of the female plate shown.

Figure 7:
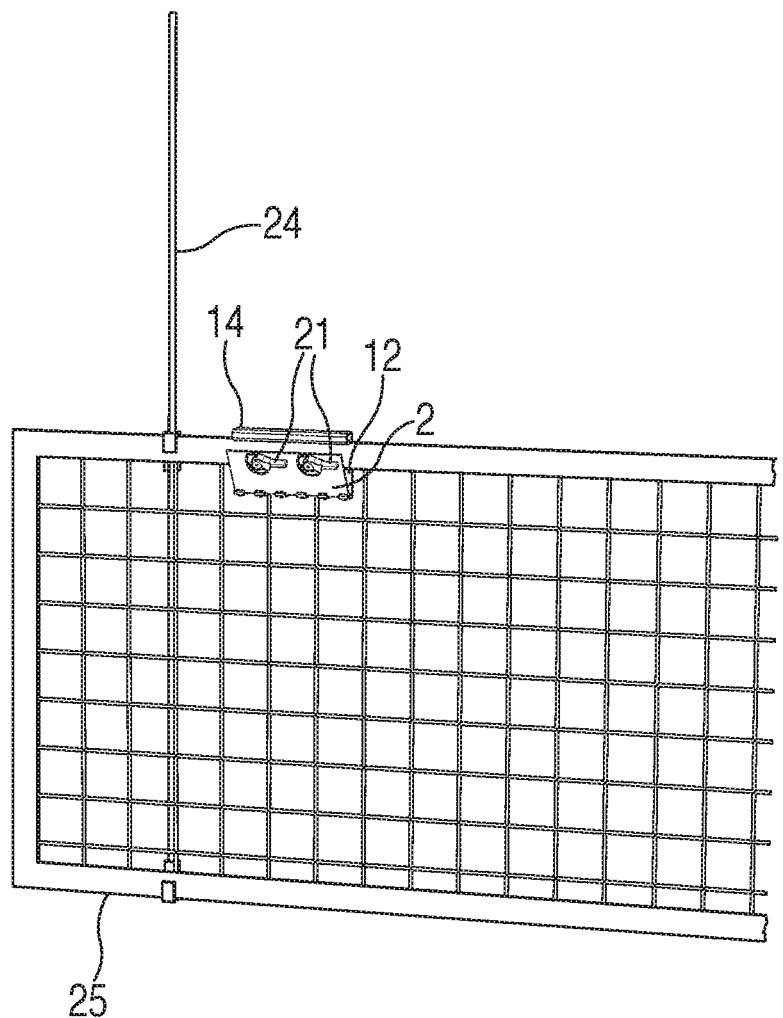
FIG. 7 illustrates the invention device open on the net with the exterior of the male plate shown.

FIG. 7 illustrates the invention device open on the net with the exterior of the male plate shown.

Figure 6:
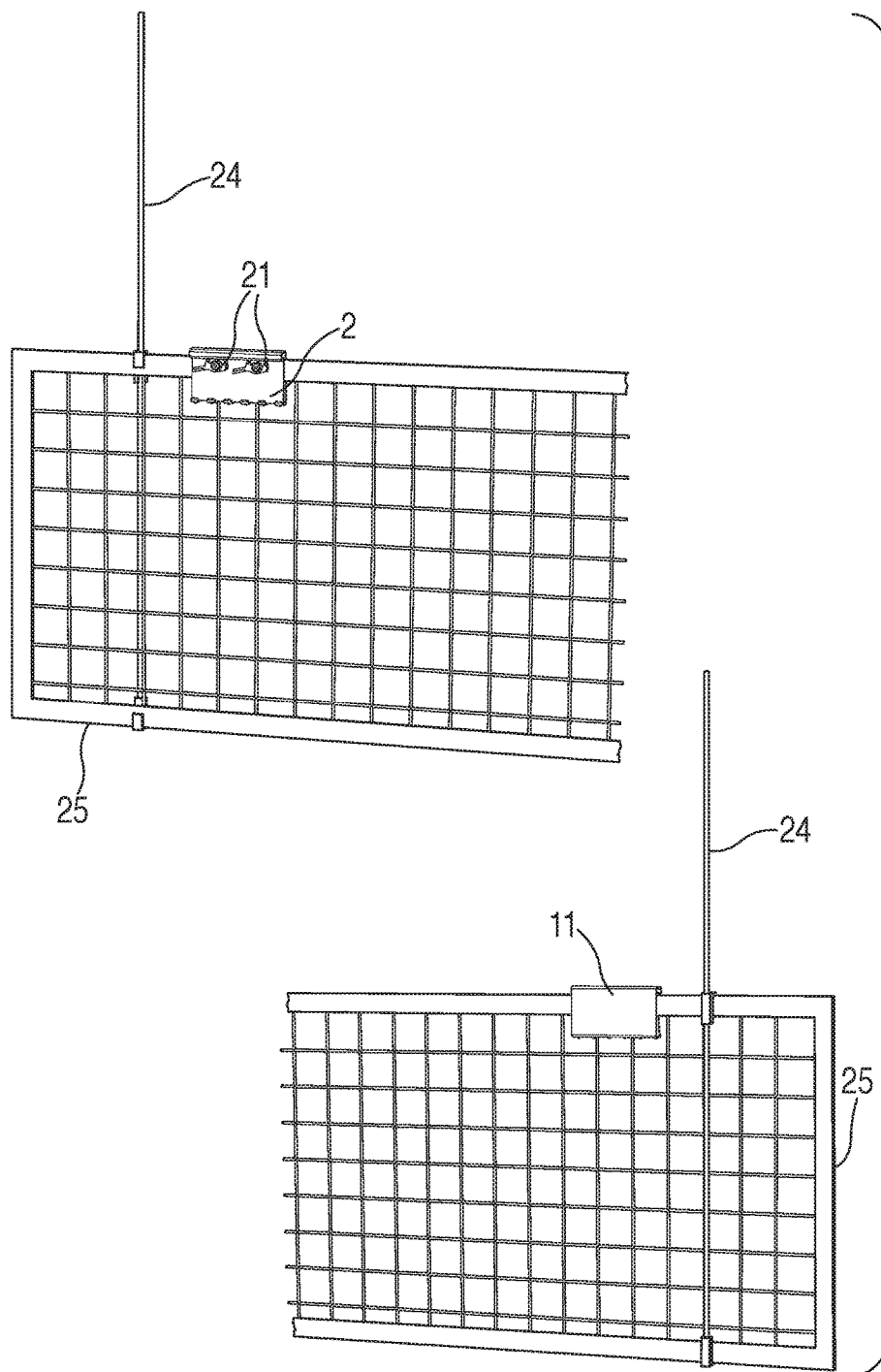
FIG. 6 shows FIG. 6A which illustrates the invention device closed on the net with the exterior of the male plate shown.

FIGS. 6 and 7 illustrate the invention mechanism on a volleyball net. The mechanism is attached to the net horizontally next to the antenna (which are stationary). The net is cranked up as usual, however, with the invention mechanism in place on the net, it allows for previously set tensions to be set up quickly, without the need for further adjustments. Once the net is set up the mechanism can be detached during play and then quickly reset in place just before the net is taken down.

The method includes placing a female plate 10 with an exterior 11 and interior 12 surface and a bottom edge 15 with a plurality protrusions 16 wherein each of the protrusions has a opening 17 therein on top of the volleyball net 25.

The male plate 1 with an exterior 2 and interior 3 surface and a bottom edge 9 with a plurality of teeth 7; and at least two stepper keys 21 on the exterior surface 2 of the male plate 1 is placed into the female plate 10 such that the male teeth 7 fit snuggly within the female protrusion openings 17.

The net between the male plate 1 and the female plate 10 is held in place by locking the stepper keys 21 in place.

When the game is over the net is taken down from the poles with the female 10 and male 1 plates clamped onto the net the positional settings are maintained such that when the net is set up for the next game the settings remain in place and no adjustments are needed.

All proportions of the components may vary depending upon the object to be clamped. For example, the angle of the stepper key and the size of the opening the stopper enters may vary.

The foregoing description of various and preferred embodiments of the present invention has been provided for purposes of illustration only, and it is understood that numerous modifications, variations and alterations may be made without departing from the scope and spirit of the invention as set forth in the following claims.

What is claimed is:

1. A clamping device for holding an object in place comprising;
    a female plate 10 with an exterior 11 and interior 12 surface and a bottom edge 15 with a plurality protrusions 16 wherein each of said protrusions has a opening 17 therein; said female plate 10 further includes a top edge 13 with a hollow tubular component 14 having a flat upper surface 18 and a flat lower surface 19 wherein there is a locking cavity 20 on said flat lower surface 19;
    a male plate 1 with an exterior 2 and interior 3 surface and a bottom edge 9 with a plurality of teeth 7; said male plate including a key opening 4 on the exterior surface 2; and
    at least one stepper key 21 on said exterior 2 surface of said male plate 1; said stepper key 21 comprised of a stepper key arm 23 for turning the stepper key into a locked and unlocked position and a stepper key opening 22 which fits over said key opening 4 on the exterior 2 of said male plate 1;
    wherein said male teeth 7 fit snuggly within said female plate protrusion openings 17 such that the object placed between said male plate 1 and said female plate 10 is held in place by turning said stepper key arm 23 which locks said stepper key 21 in place within said locking cavity 20.

2. The clamping device according to claim 1, wherein the object is a net 25 for use in volleyball games.

3. The clamping device according to claim 1, wherein said female plate 10 exterior 11 and interior 12 surfaces are both flat.

4. The clamping device according to claim 1, wherein said female plate protrusions 16 are at a 90 degree angle to said bottom edge 15.

5. The clamping device according to claim 1, wherein said hollow tubular component 14 extends at a 90 degree angle from said top edge 13.

6. The clamping device according to claim 5, wherein said hollow tubular component 14 extends from said top edge 13 approximately the same distance as said protrusions 16 on said bottom edge 15.

7. The clamping device according to claim 1, wherein said female plate 10 has six protrusions 16.

8. The clamping device according to claim 1, wherein said male plate 1 has six teeth 7.

9. The clamping device according to claim 1, wherein said key opening 4 is a circular protrusion 5 on said exterior surface 2 of said male plate 1.

10. The clamping device according to claim 1, wherein said key opening 4 is a circular depression 6 on said interior surface 3 of said male plate 1.

11. The clamping device according to claim 1, wherein said stepper key 21 is fixed in place on said male plate 1 by a fastener 26.

12. The clamping device according to claim 1, further including a foam material on said interior surfaces 3, 12 of said male 1 and female 10 plates.

13. The clamping device according to claim 1, wherein when the device is closed said interior surfaces 3, 12 of said male 1 and female 10 plates are facing each other.

14. The clamping device according to claim 1, wherein said female plate 10 and said male plate 1 are made of material selected from the group consisting of plastic, steel, carbon fiber, nylon and a combination thereof.

15. A clamping device for holding a volleyball net in place comprising:
    a female plate 10 with an exterior 11 and interior 12 surface and a bottom edge 15 with a plurality protrusions 16 extending at a 90 degree angle from said bottom edge 15 wherein each of said protrusions 16 having a opening 17 therein and a top edge 13 with a hollow tubular component 14 with a locking cavity 20, wherein said hollow tubular component 14 extends at a 90 degree angle from said top edge 13;
    a male plate 1 with an exterior 2 and interior 3 surface and a bottom edge 9 with a plurality of teeth 7, wherein said exterior surface 2 has a key opening 4; and
    a stepper key 21 on said exterior 2 surface of said male plate 1 affixed in said key opening 4; said stepper key 21 comprised of a stepper key arm 23 for turning the stepper key into a locked and unlocked position and a stepper key opening 22 which fits over said key opening 4;
    wherein said male plate teeth 7 fit snuggly within said female plate protrusion openings 17 such that the net 25 placed between said male plate 1 and said female plate 10 is held in place by turning said stepper key arm 23 and locking said stepper key 21 in place in the locking cavity 20 of said hollow tubular component 14.

16. The clamping device according to claim 15, wherein said device is between 8 to 10 inches wide, 4 to 6 inches tall and 1 to 2 inches deep.

17. A method for maintaining the positional settings of a volleyball net after a game has ended to ensure quick setup without readjustment comprising:

placing a female plate 10 with an exterior 11 and interior 12 surface and a bottom edge 15 with a plurality protrusions 16 wherein each of said protrusions has a opening 17 therein on top of the volleyball net 25;

placing a male plate 1 with an exterior 2 and interior 3 surface and a bottom edge 9 with a plurality of teeth 7 and a key opening 4; and at least one stepper key 21 on said exterior surface 2 of said male plate 1 into said female plate 10 such that said male teeth 7 fit snuggly within said female protrusion openings 17; said stepper key 21 comprised of a stepper key arm 23 for turning the stepper key into a locked and unlocked position and a stepper key opening 22 which fits over said key opening 4 on the exterior 2 of said male plate 1;

wherein the net between said male plate 1 and said female plate 10 is held in place by locking said stepper keys 21 in place;

taking down the net from the poles with the female 10 and male 1 plates clamped onto the net such that when the net is set up for the next game the positional settings are maintained.

* * * * *